United States Patent
Greaves

(10) Patent No.: US 9,833,726 B2
(45) Date of Patent: Dec. 5, 2017

(54) DISTILLATION SYSTEM AND METHOD OF DISTILLATION THEREOF

(71) Applicant: UNWUW Limited, Queenstown (NZ)

(72) Inventor: Paul George Greaves, Queenstown (NZ)

(73) Assignee: UNWUW Limited, Queenstown (NZ)

( * ) Notice: Subject to any disclaimer, the term of this patent is extended or adjusted under 35 U.S.C. 154(b) by 0 days.

(21) Appl. No.: 15/309,436

(22) PCT Filed: May 5, 2015

(86) PCT No.: PCT/NZ2015/000036
§ 371 (c)(1),
(2) Date: Nov. 7, 2016

(87) PCT Pub. No.: WO2015/170995
PCT Pub. Date: Nov. 12, 2015

(65) Prior Publication Data
US 2017/0151509 A1 Jun. 1, 2017

(30) Foreign Application Priority Data

May 5, 2014 (NZ) ........................................ 624494

(51) Int. Cl.
*B01D 3/34* (2006.01)
*B01D 3/38* (2006.01)
*C11B 9/02* (2006.01)

(52) U.S. Cl.
CPC ............... *B01D 3/346* (2013.01); *B01D 3/38* (2013.01); *C11B 9/027* (2013.01)

(58) Field of Classification Search
None
See application file for complete search history.

(56) References Cited

U.S. PATENT DOCUMENTS 5,393,498 A   2/1995  Lieberam
6,911,119 B2 *  6/2005  Babu ..................... B01D 3/10
                                                  202/153

(Continued)

OTHER PUBLICATIONS

Written Opinion of the International Searching Authority issued in PCT/NZ2015/000036, dated Jul. 1, 2015, 4 pages.

(Continued)

*Primary Examiner* — Yate K Cutliff
(74) *Attorney, Agent, or Firm* — ARC IP Law, PC; Joseph J. Mayo

(57) ABSTRACT

Described herein is a distillation system configured for continuous distillation under vacuum to produce an oil product such as an essential oil. Also described is a method of distillation and distillation product thereof. The distillation system comprises at least one distillation chamber for vaporizing a carrier liquid and passing it through a feedstock; a condenser fluidly connected to the at least one chamber; a separator fluidly connected to the condenser for separating a volatile oil product from a reformed carrier liquid; and a reflux tank fluidly connected to the separator and configured to store the reformed carrier liquid; a valve configured to dose carrier liquid from the reflux tank to the distillation chamber when the level of the carrier liquid in the distillation chamber falls below a predetermined level and a pump configured to maintain a positive carrier liquid pressure between the valve and the reflux tank.

10 Claims, 5 Drawing Sheets

(56) References Cited

U.S. PATENT DOCUMENTS

| | | | | |
|---|---|---|---|---|
| 2004/0192551 A1* | 9/2004 | Bessette | ............... | A01N 65/00 |
| | | | | 504/117 |
| 2005/0082157 A1* | 4/2005 | Kiran Babu | ............ | B01D 3/10 |
| | | | | 202/83 |
| 2005/0098425 A1 | 5/2005 | Westcott | | |
| 2011/0034712 A1* | 2/2011 | Lin | ........................ | C10G 1/02 |
| | | | | 554/22 |
| 2015/0209688 A1* | 7/2015 | Young | .................... | C11B 9/027 |
| | | | | 202/170 |

OTHER PUBLICATIONS

International Search Report and Written Opinion issued in PCT/NZ2015/000036, dated Jul. 1, 2015, 5 pages.
International Preliminary Report on Patentability issued in PCT/NZ2015/000036, dated Nov. 17 2016, 6 pages.

* cited by examiner

DISTILLATION SYSTEM AND METHOD OF DISTILLATION THEREOF

TECHNICAL FIELD

Described herein is a distillation system and method of distillation thereof. More specifically, a system and method of distillation thereof for the distillation of biomass such as wood to produce an essential oil.

BACKGROUND ART

Methods of manufacture of essential oils by the conversion of biomass are known.

Industrial scale production of essential oils is mainly achieved by steam distillation. Conventional steam distillation systems comprise a distillation chamber for boiling water, to form steam which infuses a feedstock, in the form of a plant based biomass, to produce a feedstock volatile vapour mixture; a condenser fluidly connected to the distillation vessel for forming a condensate from the feedstock volatile vapour mixture and an oil separation column fluidly connected to the condenser for separating the condensate into an essential oil product and water.

These distillation systems are relatively inefficient due to the down time in cooling the distillation chamber before opening and reloading with feedstock. In addition, as these known distillation system are open systems the water needs to be replenished.

These disadvantages limit their production capacity and the quality of the essential oil produced in terms of its fragrance. By boiling the feedstock the chemical profile of the essential oil product is changed from its natural state which can change its fragrance from that of unprocessed feedstock.

It is an object of the present invention to address the foregoing problems or at least to provide the public with a useful choice in manufacture of essential oils by the distillation of biomass.

Further aspects and advantages of the process and product will become apparent from the ensuing description that is given by way of example only.

SUMMARY OF THE INVENTION

Described herein is a distillation system configured for continuous distillation under vacuum to produce an oil product such as an essential oil. The distillation system comprises at least one distillation chamber for vapourising a carrier liquid to form a carrier vapour which passes through a feedstock, the feedstock comprising at least one volatile component, to form a feedstock vapour; a condenser fluidly connected to the at least one chamber and configured to condense the feedstock vapour to form a feedstock oil; a separator fluidly connected to the condenser and configured to separate the condensate into carrier liquid and a feedstock oil; and a reflux tank fluidly connected to the separator and configured to store the carrier liquid from the separator; wherein the distillation system also comprises a valve configured to dose carrier liquid from the reflux tank to the at least one distillation chamber when the level of the carrier liquid in the at least one distillation chamber falls below a predetermined level and a pump configured to maintain a positive carrier liquid pressure between the valve and the reflux tank. Also described is a method of distillation and distillation product thereof.

In a first aspect of the invention there is provided a distillation system comprising:

- at least one distillation chamber for vapourising a carrier liquid to form a carrier vapour which passes through a feedstock, the feedstock comprising at least one volatile component, to form a feedstock vapour;
- a condenser fluidly connected to the at least one chamber and configured to condense the carrier vapour to reform the carrier liquid and condense the feedstock vapour to form a feedstock oil;
- a separator fluidly connected to the condenser and configured to separate the reformed carrier liquid and feedstock oil; and
- a reflux tank fluidly connected to the separator and configured to store the reformed carrier liquid from the separator wherein the distillation system also comprises:
- a valve configured to dose the reformed carrier liquid from the reflux tank to the at least one distillation chamber when the level of the carrier liquid in the at least one distillation chamber falls below a predetermined level; and
- a pump configured to maintain a positive carrier liquid pressure between the valve and the reflux tank.

In this way, improved efficiency of production of a feedstock oil in a distillation system by enabling automated dosing of carrier liquid to the at least one distillation chamber.

The term 'comprise' and grammatical variations thereof shall have an inclusive meaning—i.e. that it will be taken to mean an inclusion of not only the listed components it directly references, but also other non-specified components or elements.

The term 'carrier liquid' refers to a polar carrier liquid, such as water or ethanol, capable of infusing a feedstock to vaporise at least one volatile component of the feedstock such as terpenes (including bicyclic monoterpenes or cyclic terpenes) from pine tree parts.

The term 'carrier vapour' refers to the vapour formed from vapourisation of the carrier liquid to form a gaseous phase and capable of infusing a feedstock material to vaporise at least one volatile component of the feedstock.

The term 'feedstock vapour' refers to at least one component from a feedstock capable of being vapourised on contact with the carrier vapour and may comprise at least one natural aromatic chemicals.

The term 'feedstock' refers to a raw material used for the distillation of volatile chemicals. Such raw materials may be a biomass such as plant parts such as wood, seeds, straw, leaves, pine needles, pine cones, flowers, peel, or the like, or biomass-derived components, such as lignin, cellulose, hemicelluloses, or non-biomass derived material with at least one volatile chemical component.

The term 'feedstock oil' is a concentrated hydrophobic liquid containing natural volatile chemicals from a feedstock, such as a aromatic terpenes (including bicyclic monoterpenes or cyclic terpenes) or other fragrant natural aromatics from pine tree parts.

The term 'reflux tank' refers to a container configured to store the condensation of carrier and feedstock vapours and the return of this condensate to the distillation system.

The term 'vacuum' refers to a reduced (negative) air pressure below 1 atmosphere produced by removal of air from the distillation system at the reflux tank of the distillation system.

The term 'dosing' refers to the supply of reformed carrier liquid from the reflux tank to the at least one distillation chamber on demand depending on the level of carrier liquid in the at least one distillation chamber.

According to a second aspect of the present invention there is provided a method of distillation comprising the following steps:
a) vapourising a carrier liquid contained in a distillation chamber to produce a carrier vapour which passes through a feedstock, the feedstock comprising at least one volatile component, to form a feedstock vapour;
b) condensing the carrier vapour to reform the carrier liquid and condensing the feedstock vapour to form a feedstock oil;
c) separating the reformed carrier liquid and feedstock oil; and
d) collecting the reformed carrier liquid and dosing it to the at least one distillation chamber when a water level in the least one distillation chamber falls below a predetermined level.

In a third aspect of the present invention there is provided an essential oil produced by the method of distillation described above.

The advantages of the present invention include:
improved efficiency of production and improved yield of a feedstock oil in a distillation system by enabling continuous processing of feedstock with a resulting increase in production capacity;
improved portability of the distillation system to enable transport to areas of feedstock supply;
improved redundancy in the distillation system to enable more reliable continuous processing of feedstock;
a reduction in energy costs by lowering the boiling temperature of the carrier liquid in the at least one chamber by applying a vacuum; and
improved quality of an oil product such as an essential oil by minimising thermal decomposition and degradation of the feedstock volatile oil components.

BRIEF DESCRIPTION OF THE DRAWINGS

Further aspects of the distillation system and method of distillation will become apparent from the following description that is given by way of example only and with reference to the accompanying drawings in which.

DETAILED DESCRIPTION OF THE INVENTION

Figure 1:
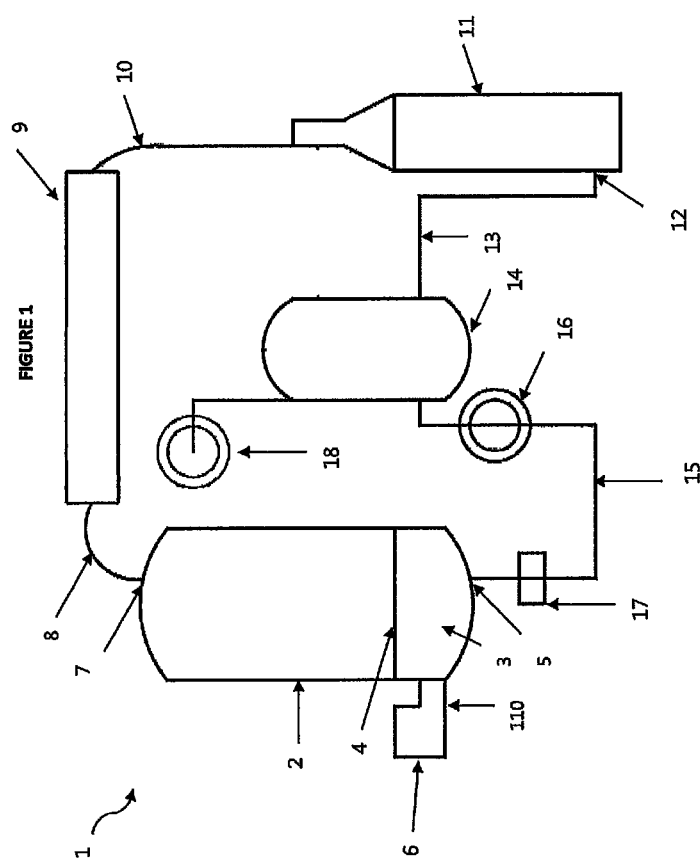
FIG. 1 shows a schematic representation illustrating the main components of the distillation system of the present invention.

As noted above, described herein is a distillation system configured for continuous distillation under vacuum to produce an oil product such as an essential oil. The distillation system comprises at least one distillation chamber for vapourising a carrier liquid to form a carrier vapour which passes through a feedstock, the feedstock comprising at least one volatile component, to form a feedstock vapour; a condenser fluidly connected to the at least one chamber and configured to condense the feedstock vapour to form a feedstock oil; a separator fluidly connected to the condenser and configured to separate the condensate into carrier liquid and a feedstock oil; and a reflux tank fluidly connected to the separator and configured to store the carrier liquid from the separator; wherein the distillation system also comprises a valve configured to dose carrier liquid from the reflux tank to the at least one distillation chamber when the level of the carrier liquid in the at least one distillation chamber falls below a predetermined level and a pump configured to maintain a positive carrier liquid pressure between the valve and the reflux tank. Also described is a method of distillation and distillation product thereof.

In a first aspect of the invention there is provided a distillation system comprising:
at least one distillation chamber for vapourising a carrier liquid to form a carrier vapour which passes through a feedstock, the feedstock comprising at least one volatile component, to form a feedstock vapour;
a condenser fluidly connected to the at least one chamber and configured to condense the carrier vapour to reform the carrier liquid and condense the feedstock vapour to form a feedstock oil;
a separator fluidly connected to the condenser and configured to separate the reformed carrier liquid and feedstock oil; and
a reflux tank fluidly connected to the separator and configured to store the reformed carrier liquid from the separator
wherein the distillation system also comprises:
a valve configured to dose the reformed carrier liquid from the reflux tank to the at least one distillation chamber when the level of the carrier liquid in the at least one distillation chamber falls below a predetermined level; and
a pump configured to maintain a positive carrier liquid pressure between the valve and the reflux tank.

The distillation system may have 1, or 2, or 3, or 4, or more distillation chambers. In one embodiment, the distillation system may have 4 distillation chambers. The feedstock capacity of each distillation chamber may range from substantially 20 kg to 240 kg or more.

In one embodiment, each distillation chamber may be made from 3 mm stainless steel and may be cylindrical in shape with a diameter of 780 mm for a cap portion and bottom portion with domes 90 mm deep. The distillation chamber may be split at 410 mm from the top dome with a distance of 450 mm to the bottom dome. The join between the top and bottom portions is joined using a flange constructed of 4 mm stainless on the top section and bottom section and pulled together with a made flange gasket. Silicone seals are used to assist with sealing the join. The bottom and top sections of each distillation chamber is wrapped in insulating material to assist in the heat retention of the distillation chamber.

The distillation chamber may comprise at least one inlet for a carrier liquid source to replenish the receptacle in the distillation chamber for holding the carrier liquid. The receptacle may comprise a heating element with energy supplied from an energy source such as a burner heater. Alternative energy sources may be LPG gas burner or electric heater or microwave. In one embodiment the heating element is a fire tube heating element heated from a gas burner with high output to get the water boiling quickly. The gas burner has three burner rings each burner ring under its own manual control and with its own lighter. Without operating the at least one under a vacuum the gas burner would produce 82500 BTU with an energy consumption rate of 86.4612 MJ/Hour. At this rate the distillation system would run for 14 hours at full capacity. Operating the at least one chamber under a vacuum enables running at lower temperatures which will reduce the required energy input to 15000 BTU=4.4 kw which equates to a 15.84 MJ/hour energy consumption rate which will extend the operating time to 70 hours. The gas is supplied from two 45 kg gas cylinders enabling the distillation plant (1) to run continuously for 23.6 days on two bottles. The gas cylinders are held in an enclosed lined rack which will enable heating to an optimum temperature of between 16 and 20° C. to maintain the necessary flow from the gas cylinders. In another embodiment, the firetube heating element is heated by a diesel or kerosene burner running at about 25 to 31 KW.

The distillation chamber may also comprise at least one outlet for the carrier vapour and feedstock vapour.

In one embodiment the carrier liquid may be a polar carrier liquid, such as water, capable of infusing a feedstock to vaporise at least one volatile component of the feedstock.

In one embodiment the feedstock may be pine tree parts such as pine needles or pine wood offcuts. Other forms of feedstock could also be used with the distillation system as described such as biomass organic materials such as wood, seeds, straw, leaves, pine needles, pine cones, flowers, peel, or the like, or biomass-derived components, such as lignin, cellulose, hemicelluloses.

In one embodiment the feedstock oil produced may be an essential oil. The essential oil may comprise at least one aromatic natural terpene derived from tree parts such as bicyclic monoterpenes or cyclic terpenes. Non-limiting examples may include pinene (alpha), pinene (beta), isopulegol, sabinene, myrcene, 3-carene, limonene, phellandrene (beta), terpinene (gamma), terpinolene, citronellal, citronellol, citronellyl acetate and geranyl acetate.

In one embodiment the condenser may be a Liebig type condenser comprising a straight glass tube within a cooling water jacket used to condense the carrier vapor and feedstock by heat transfer into liquid. In alternate embodiments, the condenser may be a Graham type condenser comprising a spiral tube within a water jacket, or an Allihn type condenser comprising a series of large and small constrictions on an inside tube, each increasing the surface area upon which the vapours may condense, or an air-cooled condenser which is unjacketed.

In one embodiment the separator is a column with a glass viewing port constructed from stainless steel and connected to the outlet of the condenser. The separator column may be vertical in orientation. Where water is used as a carrier liquid, the volatile feedstock oil separates as an upper layer from the water distillate as it is lighter than water. The separator comprises a return pipe at the bottom of the column for recycling of reformed carrier liquid distillate. The feedstock oil is retrieved by opening a valve at any time during operation of the distillation system.

In one embodiment, the reflux tank comprises a water level control to allow fresh water from an external water supply to enter the distillation system if the water levels in the distillation chamber and reflux tank become low. The central water supply is also used to circulate water around the distillation chamber as a cooling aid before being piped to the gas cylinder insulated rack to heat same.

In one embodiment the valve may be a solenoid valve although other types of non-return valves could be used.

The distillation system may also comprise a vacuum pump configured to produce a vacuum in the reflux tank to create a negative pressure in the at least one distillation chamber, condenser and separator and intervening piping to draw fluid through from the at least one distillation chamber, via the condenser and via the separator to the reflux tank to provide fluid flow through the distillation system. In this way, a high vapour flow rate of 800 milliliters to 1 litre of vapour can be transferred between the at least one distillation chamber and the condenser. This high fluid transfer rate provides the advantage of improved efficiency of production of a feedstock oil with a resulting increase in production capacity.

Multiple vacuum pumps may be used in case the primary vacuum pump malfunctions. In this way, redundancy in the distillation system is achieved to keep the distillation system running continuously.

The negative air pressure created by the vacuum pump enables a lower distillation temperature to be achieved in the at least one chamber which provides the advantages of a reduced energy requirement, an improvement in operating efficiency by minimising cool-down time of the distillation chamber before reloading a feedstock into the chamber and an improved quality of an oil product such as an essential oil by minimising thermal decomposition and degradation of the feedstock volatile oil components. This is advantageous, as it means that lower energy input is required for the chamber, thereby increasing energy efficiency.

The combination of the positive water pressure created by the combination of valve and water pump in the line between the reflux tank and the at least one distillation chamber and the negative air pressure between the at least one distillation chamber and the reflux tank created by the vacuum pump enables continuous flow of fluid in the distillation system.

According to a second aspect of the present invention there is provided a method of distillation comprising the following steps:
  a) vapourising a carrier liquid contained in a distillation chamber to produce a carrier vapour which passes through a feedstock, the feedstock comprising at least one volatile component, to form a feedstock vapour;
  b) condensing the carrier vapour to reform the carrier liquid and condensing the feedstock vapour to form a feedstock oil;
  c) separating the reformed carrier liquid and feedstock oil; and
  d) collecting the reformed carrier liquid and dosing it to the at least one distillation chamber when a water level in the least one distillation chamber falls below a predetermined level.

In one embodiment the method steps a) to c) are performed under a vacuum. The carrier liquid in the at least one distillation chamber may be heated to a temperature of 74 to 82° C. and with a partial vacuum of 18 to 22 inHg.

In use, the waste wood may be chipped either in the field or once brought to site and optionally pulverised to sawdust in a hammer mill before processing. Wood may be derived from tree waste such as forestry offcuts from the following tree species Douglas Fir, *Pinus Radiata, Pinus Nigra, Pinus Contorta, Larch, Cypress Macrocarpa, Cedrela odorata* (cigar box-wood tree), *Boswellia sacra* (Frankincense wood resin).

The wood chips or sawdust may be loaded into charge bags. The charge bags may optionally be loaded into a charge basket. The charge baskets may be then lifted by a crane into the first still and weighed by scales on the swivel crane. The chamber may be then closed and sealed. A vacuum pump may be switched on and the fire tube heating element heated via the heater. The second (and subsequent still) may be then loaded in the same way and a vacuum applied. In this way, each still may be reloaded and heated within a quick turnaround time period of about 5 to 15 minutes.

Internal charge baskets may be configured to handle charge bags containing chipped feedstock material. There may be two charge baskets for each distillation chamber so that the next charge can be set ready for processing when the first charge basket has been exhausted. These charge baskets may be made of 2 mm stainless steel. The bottoms may be made of stainless steel but with 10 mm holes punched in to allow steam to pass through. The sides may be 10 mm inside the main pot and allow an air gap for heat to collect in and help the steaming process and ease to removing the charge basket. They may be about 710 mm diameter and 800 mm deep respectively. The load baskets may take the chip but they may be charged with a charge bag designed to be placed into the charge basket. These charge bags may be preloaded with the chip and may be porous to allow free steam to pass through. This makes the charging and material collection subject to less waste through spillage.

In one embodiment, a distillation column may be positioned within the distillation chamber which may accept vapour from each of the two steaming pots and may comprise two spiral tubes made of 12.7 mm stainless steel with a total distance of 12 m.

The target processing time for each load may be 45 to 60 minutes per load. This would give a 7 hour productive day of still time or 9.3 loads/per still/day. This is equal to 6.7 litres of oil per day. Assuming oil content of the feedstock is 0.4% of the dry weight, target extraction efficiency of oil is 80% of the available oil. The steam flow through the feedstock in each distillation chamber is approximately 0.8 litres a minute.

In a third aspect of the present invention there is provided an essential oil produced by the method of distillation described above.

The embodiments described above may also be said broadly to consist in the parts, elements and features referred to or indicated in the specification of the application, individually or collectively, and any or all combinations of any two or more said parts, elements or features.

Further where specific integers are mentioned herein which have known equivalents in the art to which the embodiments relate, such known equivalents are deemed to be incorporated herein as if individually set forth.

WORKING EXAMPLES

The above-described distillation system, method of distillation and essential oil product thereof are now described by reference to the Figures and specific examples.

Example 1

General Distillation System and Method Thereof

Figure 2:
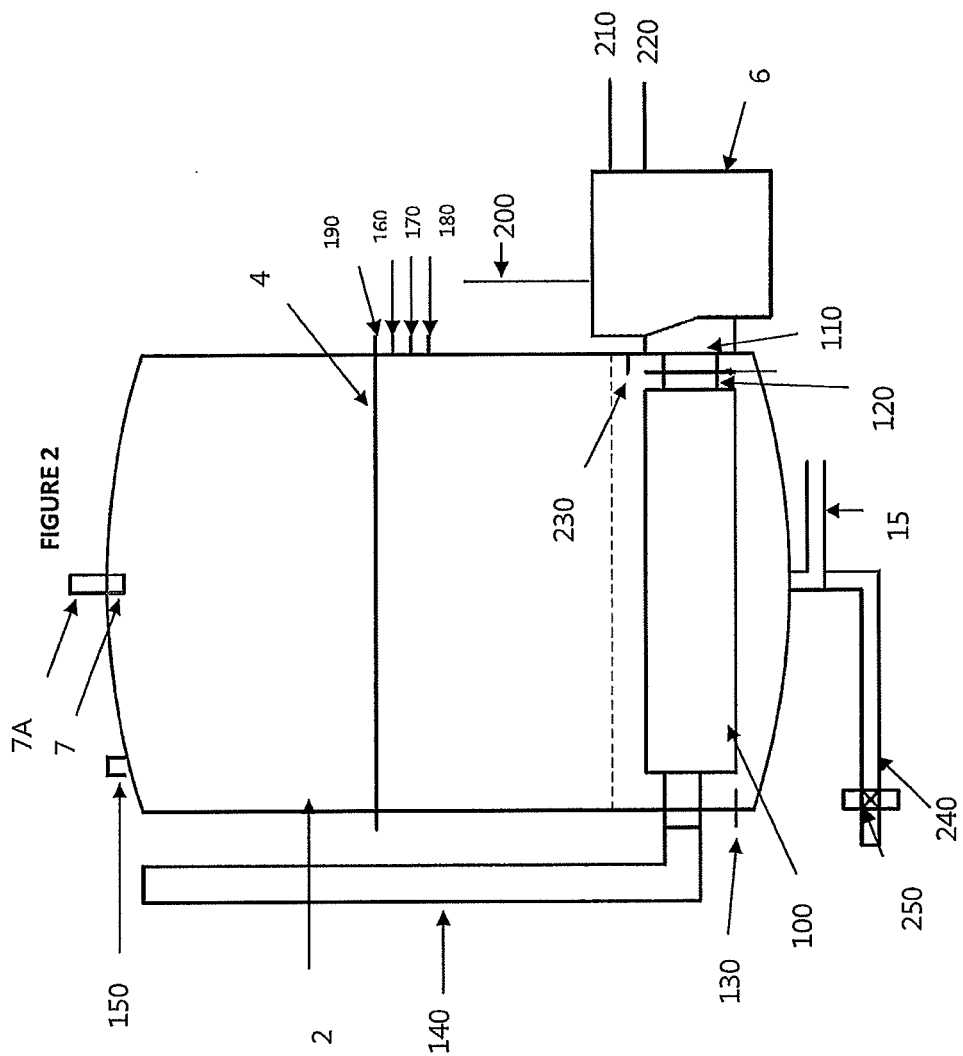
FIG. 2 shows a close-up schematic representation of the distillation vessel shown in FIG. 1.
Figure 3:
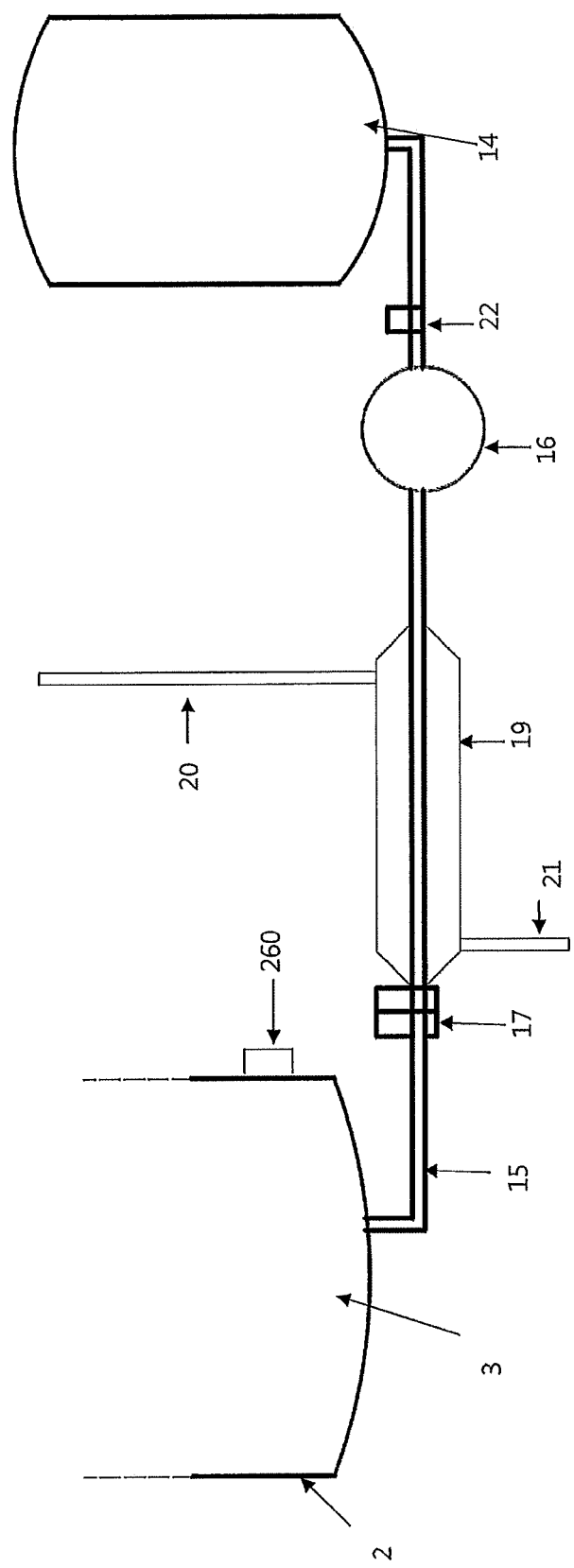
FIG. 3 shows a close-up schematic representation of the connection between the reflux tank and the distillation vessel shown in FIG. 1.

Referring to FIGS. 1 to 3, a preferred form of the present invention, a distillation system is generally indicated by arrow 1. The distillation system (1) comprises a chamber (2) for holding a carrier liquid in the form of water held in a receptacle (3) and a splitter (4) for holding a feedstock in the form of wood (not shown). The receptacle (3) is fluidly connected to an inlet in the form of an inlet valve (6) to receive water. The chamber (2) comprise an energy source in the form of a diesel burner (6) which heats a fire tube heating element (100; shown in FIG. 2) via a heat transfer pipe (110) and associated flange (120) to heat and vapourise the water to produce steam which passes through the feedstock to vapourise volatile components of the feedstock to produce a steam and feedstock vapour mixture which rises in the chamber (2) and exits via an outlet in the form of a camlock coupling (7; shown in FIG. 2).

The steam and feedstock vapour mixture then passes along pipe (8) to a condenser (9) to form a condensate comprising reformed water as a distillate and a feedstock oil product.

The pipe (8) is 40 mm in diameter with two camlock couplings at intervals inline to the pipe (8) to allow for dismantlement, and a ball tap to allow for fluid samples to be taken for quality control purposes.

The reformed water and feedstock oil product then passes via 19 mm pipe (10) to a separator in the form of a separator column (11) which retains the oil product in a top section of the separator column (11) visible with a glass viewing port (not shown). A valve and tap (12) in the bottom of the separator column (11), and positioned before pipe (13) downstream of the separator (11), provides for draining of the reformed water (containing a low proportion of oil product in the form of a hydrosol) into a reflux tank (14). The separator column (11) is made of stainless steel with a capacity of 11 litres. Pipe (13) is 19 mm in diameter.

The collected water is stored in the reflux tank (14) until there is a demand from the chamber (2) for more water for distillation. In this way the water is recycled back to the distillation chamber for heating again.

The dosing of water to the receptacle (3) on demand is possible via a combination of a pump (16) and valve in the form of a solenoid valve (17) positioned in pipe (15). The pump (16) keeps the water pressure between the pump (16) and solenoid valve (17) at a positive pressure of approximately 30 psi. The solenoid valve (17) stops water entering the receptacle (3). Pipe (15) is 19 mm in diameter with two camlock couplings at intervals inline to allow for dismantlement, and a ball tap to allow for fluid samples to be taken for quality control purposes.

A water sensor (230; shown in FIG. 2) measures the water level in the receptacle (3). If the water level falls below a predetermined level (such as 50 milliliters above the firetube heating element), the solenoid valve (17) is opened to allow a positive pressure flow of water through inlet (5) into the receptacle (3). Once the receptacle (3) is full, the solenoid valve (17) closes. The pump (16) operates until a positive water pressure is again achieved in line (15) between the pump (16) and solenoid valve (17). The pump (16) is then shut down waiting for the next demand for water.

Multiple distillation chambers (2) can be fluidly connected to line (15) between the reflux tank (14) and the distillation chamber (2). Each outlet has its own solenoid valve (17). The inlet valve and tap (5) can isolate a particular chamber (2) when the feedstock needs to be replaced. This means that any chamber (2) can be unloaded and reloaded without the rest of the distillation chambers (2) being shut down. This enables the distillation system (1) to work continuously to process feedstock.

The distillation system (1) also comprises a vacuum pump (18) to produce a vacuum in the closed circuit between the distillation chamber (2) and the reflux tank (14). The vacuum pump (18) removes up to 60 litres of air per minute and can operate automatically to reduce air pressure to enable the boiling temperature of water to reduce to between 70 and 85° C.

The vacuum pump (18) causes the operating temperature of the distillation chamber (2) to be lowered (by approximately 30° C.) which results in a reduced cool-down time before recharging the distillation chamber (2) with fresh feedstock after the particular distillation chamber (2) has been isolated from the rest of the distillation system (1) via taps (not shown). Once recharged with feedstock the particular distillation chamber (2) is fluidly reconnected to the rest of the distillation system (1) by opening the relevant fluid line taps. The diesel burner (6) for the particular distillation chamber (2) is then restarted.

Referring to FIG. 2, the distillation chamber (2) also comprises a temperature gauge (130) to measure the temperature of the water in the receptacle (3). An exhaust (140) carries waste gases from the fire tube heating element (100). The distillation chamber (2) also has a manual air pressure or vacuum release tap (150) to vent the distillation chamber (2) if needed. An automatic safety pressure release valve (160) is set to release air pressure in the distillation chamber (2) when a predetermined air pressure is exceeded (such as between 3 and 10 psi). An automatic vacuum safety vacuum release valve (170) is set to release the vacuum inside the distillation chamber (2) when a predetermined vacuum is exceeded (such as 22 inHg). A gauge (180) enables the air pressure and vacuum level to be monitored within the distillation chamber (2). A locking clamp (190) around the circumference of the distillation chamber (2) compresses a seal (not shown) between a top and bottom section of the chamber (2).

The diesel burner (6) is supplied with power via a 240 v/110 w electrical power supply (200). Diesel is supplied via a supply line (210) and diesel overflow is released via an overflow line (220).

FIG. 3 shows a close-up of the distillation system (1) between the reflux tank (14) and the receptacle (3) of the chamber (2). A water jacket (19) preheats the water going back to the receptacle (3) to minimise down-time in heating the water in the receptacle (3) to start vaporising. The water jacket (19) is supplied with hot water from the condenser (9) via line (20) and also comprises a waste water line (21). An inline water filter (22) removes contaminants from the water flow in line (15).

The distillation system (1) can be transported in a standard ISO shipping container to a source of fresh feedstock, such as a forestry mill producing forestry off cuts such as waste wood.

Example 2

Production of Essential Oil from Douglas Fir Pine Needles

Figure 4:
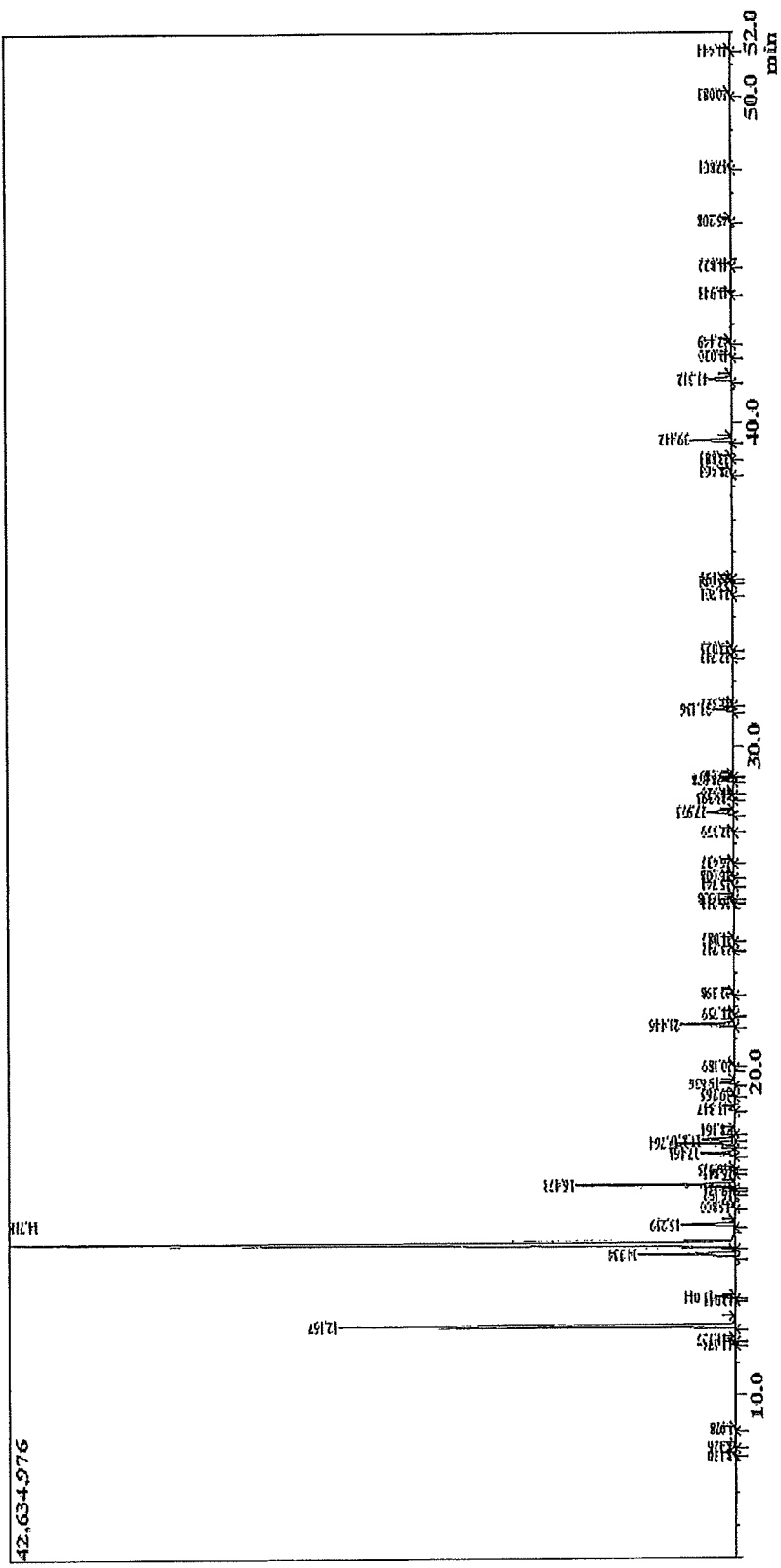
FIG. 4 shows a chromatogram of Douglas Fir needles using the distillation system and method of distillation of the present invention without a vacuum applied to the reflux tank.
Figure 5:
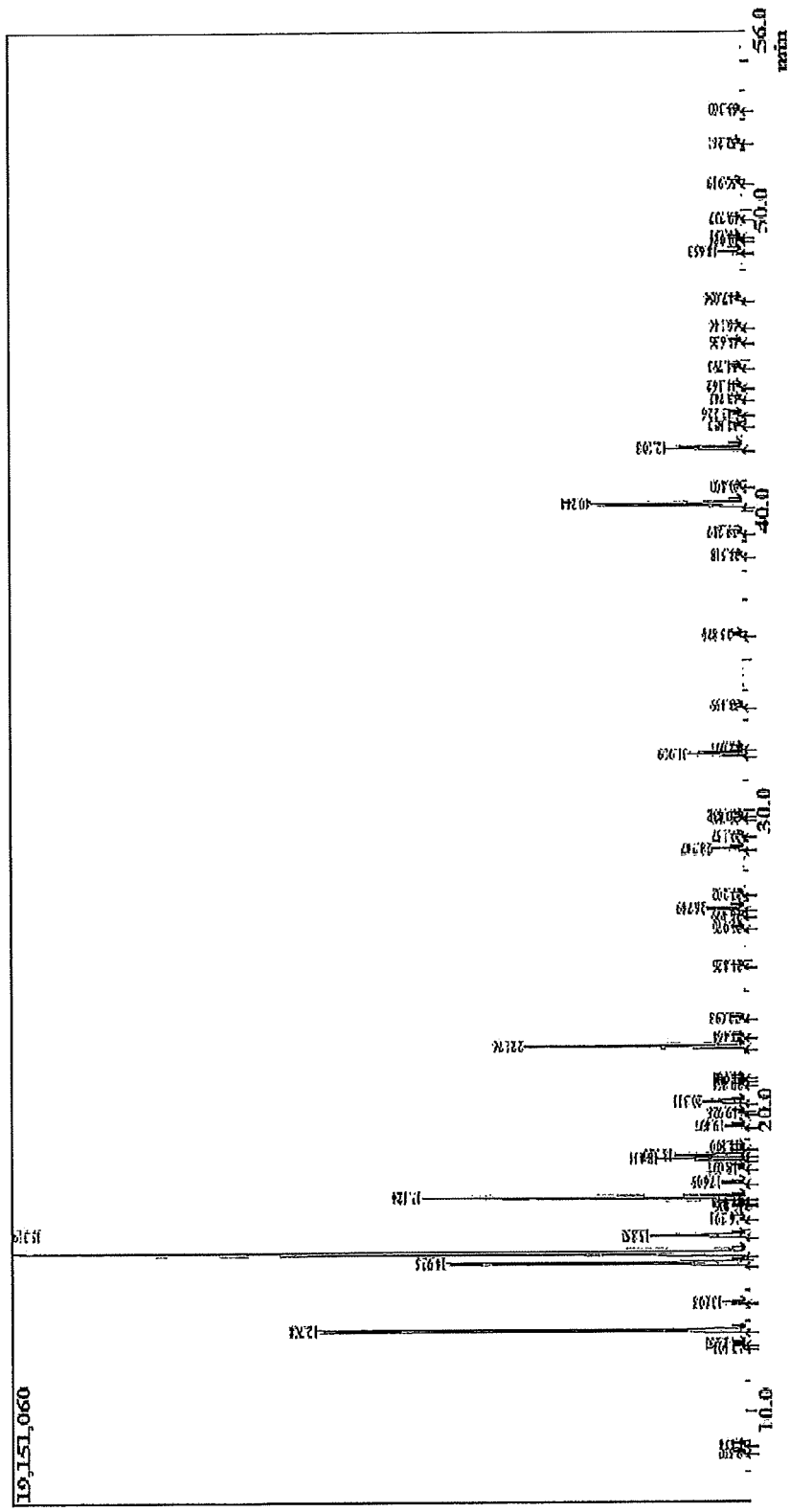
FIG. 5 shows a chromatogram of Douglas Fir needles using the distillation system and method of distillation of the present invention with a vacuum applied to the reflux tank.

Referring to FIGS. 4 and 5, the distillation system (1) as described in Example 1 above was used to extract an essential oil from Douglas fir needles. The profile of the essential oil produced was determined by gas chromatography mass spectrometry (GCMS). A gas chromatograph of the chemical profile of oil product produced without a vacuum applied to the distillation system is shown in FIG. 4. A corresponding peak report is shown in Table 1 below. A gas chromatograph of the chemical profile of oil product produced with a vacuum applied to the distillation system is shown in FIG. 5. A corresponding peak report is shown in Table 2 below.

On comparison of the profiles shown in Tables 1 and 2, it can be seen that the application of a vacuum to the distillation system (1) during its operation produces a different composition. The relative amounts of pinene (alpha), pinene (beta) and isopulegol significantly decreased while the relative amounts of sabinene, myrcene, 3-carene, limonene, phellandrene (beta), terpinene (gamma), terpinolene, citronellal, citronellol and citronellyl acetate significantly increased. In addition, a new compound geranyl acetate was detected (at retention time 42.108 minutes in Table 2 with a peak area of 2.55%).

The inventor has found that the essential oil represented in FIG. 5 and Table 2 has an improved quality of fragrance which is closer to the natural smell of the at least one volatile component of the feedstock which is partly due to the increased proportions of citronellal, citronellol, citronellyl acetate and geranyl acetate. The inventor has also found that the location of tree growth affects the chemical profile of the essential produced.

The essential oil produced can be sold directly or used as a base fragrance composition in the manufacture of a perfume product.

TABLE 1

Peak Report TIC

| R. Time | Name | Area % |
|---|---|---|
| 8.180 | Ethyl 2-methylbutyrate | 0.07 |
| 8.426 | Hexenol <3Z> | 0.08 |
| 8.978 | Hexenol + 1-isoproylmethylcyclopentane | 0.04 |
| 11.574 | Tricyclene | 0.08 |
| 11.727 | Thujene <alpha-> | 0.28 |
| 12.167 | Pinene <alpha> | 17.17 |
| 12.948 | Fenchene <alpha> | 0.03 |
| 13.044 | Camphene | 0.80 |
| 14.334 | Sabinene | 4.68 |
| 14.718 | Pinene <beta-> | 49.66 |
| 15.259 | Myrcene | 2.18 |
| 15.800 | Ethyl capronoate | 0.15 |
| 16.192 | Hexenyl acetate | 0.03 |
| 16.321 | Phellandrene <alpha-> | 0.04 |
| 16.478 | 3-Carene | 7.05 |
| 16.845 | 1,4-Cineole | 0.04 |
| 16.975 | Terpinene <alpha-> | 0.25 |
| 17.463 | Cymene <para-> | 1.50 |
| 17.764 | Limonene | 2.48 |
| 17.870 | Phellandrene <beta> | 1.40 |
| 18.164 | Ocimene <Z-beta> | 0.14 |
| 18.847 | Ocimene <E-beta> | 0.23 |
| 19.265 | Cis-Dioxospirononane[4,4]<2,29-trimethyl> | 0.12 |
| 19.636 | Terpinene <gamma> | 0.64 |
| 20.189 | Trans-Dioxospirononane[4,4]<2,29-trimethyl> | 0.04 |
| 21.446 | Terpinolene | 2.54 |
| 21.759 | Cymenene <para-> | 0.04 |
| 22.398 | Linalool | 0.12 |
| 23.742 | Fenchol <endo> | 0.04 |
| 24.087 | Menth-2-en-1-ol <cis-p> | 0.03 |
| 25.211 | Pinocarveol <trans-(−)> | 0.10 |
| 25.338 | Terpinolene<epoxy> | 0.25 |
| 25.744 | Isopulegol | 0.05 |
| 26.008 | Citronellal | 0.09 |
| 26.437 | Isopulego <iso> | 0.03 |
| 27.379 | Borneol | 0.02 |
| 27.975 | Terpinen-4-ol | 1.30 |
| 28.393 | p-cymen-8-ol | 0.27 |
| 28.526 | Fir<91,1187> | 0.03 |
| 28.978 | Terpineol <alpha> | 0.55 |
| 29.089 | Ethyl octanoate | 0.10 |
| 31.136 | Citronellol | 1.08 |
| 31.322 | Thymol methyl ether | 0.03 |
| 32.743 | Geraniol | 0.06 |
| 33.025 | Fragonia<1253,43> | 0.03 |
| 34.701 | Fir<95,1277> | 0.04 |
| 35.081 | Bornyl acetate | 0.15 |
| 35.191 | Anethole<trans> | 0.02 |
| 38.468 | Elemene <delta> | 0.05 |
| 38.888 | Fir<119,1340,43> | 0.04 |
| 39.442 | Citronellyl acetate | 2.17 |

TABLE 1-continued

Peak Report TIC

| R. Time | Name | Area % |
|---|---|---|
| 41.312 | Geranyl acetate | 1.20 |
| 42.030 | Elemeno <beta> | 0.03 |
| 42.449 | Ethyl decanoate | 0.09 |
| 43.948 | Caryophyllene | 0.02 |
| 44.822 | Bergamotene <trans-alpha> | 0.02 |
| 46.208 | Humulene <alpha> | 0.08 |
| 47.801 | Germacrene D | 0.04 |
| 50.083 | Cadinene <delta> | 0.05 |
| 51.444 | UCitrus | 0.03 |
|  |  | 100.00 |

TABLE 2

Peak Report TIC

| R. Time | Name | Area % |
|---|---|---|
| 8.593 | Ethyl 2-methylbutyrate | 0.05 |
| 8.854 | Hexenol <3Z> | 0.04 |
| 12.101 | Tricyclene | 0.05 |
| 12.252 | Thujene <a> | 0.25 |
| 12.708 | Pinene <alpha> | 12.28 |
| 13.608 | Camphene | 0.55 |
| 14.935 | Sabinene | 10.00 |
| 15.319 | Pinene <beta-> | 33.41 |
| 15.852 | Myrcene | 2.50 |
| 16.391 | Ethyl capronoate | 0.14 |
| 16.806 | Hexenyl acetate | 0.02 |
| 16.949 | Phellandrene <alpha-> | 0.08 |
| 17.124 | 3-Carene | 10.36 |
| 17.609 | Terpinene <alpha-> | 0.63 |
| 18.097 | Cymene <para-> | 0.19 |
| 18.414 | Limonene | 2.56 |
| 18.525 | Phellandrene <beta> | 1.98 |
| 18.800 | Ocimene <cis> | 0.11 |
| 19.497 | Ocimene <E-beta> | 0.56 |
| 19.928 | Cis-Dioxospirononane[4,4]<2,29-trimethyl> | 0.20 |
| 20.311 | Terpinene <gamma> | 1.21 |
| 20.865 | Trans-Dioxospirononane[4,4]<2,29-trimethyl> | 0.06 |
| 21.045 | Heptanoate <methyl> | 0.02 |
| 21.108 | Sabinene-hydrate<Z> | 0.03 |
| 22.176 | Terpinolene | 7.43 |
| 22.464 | Cymenene <para-> | 0.03 |
| 23.098 | Linalool | 0.13 |
| 24.826 | p-menth-2-en-1-ol<Z> | 0.04 |
| 26.076 | Terpionelene epoxy + Menth-2-en-1-ol-E-p | 0.04 |
| 26.499 | Isopulegol | 0.05 |
| 26.749 | Citronellal | 1.17 |
| 27.202 | Isopulegol <iso> | 0.03 |
| 28.747 | Terpinen-4-ol | 1.04 |
| 29.157 | p-cymen-8-ol | 0.03 |
| 29.750 | Terpineol <beta> | 0.09 |
| 29.832 | Ethyl octanoate | 0.19 |
| 31.909 | Citronellol | 1.82 |
| 32.097 | Thymol methyl ether | 0.07 |
| 33.499 | Geraniol | 0.07 |
| 35.879 | Bornyl acetate | 0.33 |
| 38.518 | Methyl decanoate | 0.04 |
| 39.289 | Elemene <delta-> | 0.14 |
| 40.244 | Citronellyl acetate | 5.36 |
| 40.800 | Neryl acetate | 0.03 |
| 42.108 | Geranyl acetate | 2.55 |
| 42.853 | Elemene <beta> | 0.10 |
| 43.226 | Ethyl decanoate | 0.28 |
| 43.743 | Sibirene | 0.06 |
| 44.162 | Longifolene | 0.12 |
| 44.793 | Caryophyllene <trans> | 0.09 |
| 45.636 | Bergamotene <trans-alpha> | 0.04 |
| 46.146 | Guanidiene <6,9> | 0.07 |
| 47.056 | Humulene <alpha> | 0.23 |
| 48.653 | Germacrene D | 0.80 |
| 49.024 | Selinene <delta> | 0.04 |

TABLE 2-continued

Peak Report TIC

| R. Time | Name | Area % |
|---|---|---|
| 49.151 | Selinene beta | 0.02 |
| 49.737 | Muurolene <alpha> | 0.02 |
| 50.919 | Cadinene <delta> | 0.09 |
| 52.261 | Bisabolene <isomer> | 0.08 |
| 53.360 | Germacrene B | 0.03 |
|  |  | 100.00 |

Aspects of the present invention have been described by way of example only and it should be appreciated that modifications and additions may be made thereto without departing from the scope thereof, as defined in the appended claims.

What is claimed is:

1. A distillation system comprising:
   at least one distillation chamber for vapourising a carrier liquid to form a carrier vapour which passes through a feedstock, the feedstock comprising at least one volatile component, to form a feedstock vapour;
   a condenser fluidly connected to the at least one chamber and configured to condense the carrier vapour to reform the carrier liquid and condense the feedstock vapour to form a feedstock;
   a separator fluidly connected to the condenser and configured to separate the reformed carrier liquid and feedstock oil;
   a reflux tank fluidly connected to the separator and configured to store the reformed carrier liquid from the separator;
   a valve configured to dose the reformed carrier liquid from the reflux tank to the at least one distillation chamber when the level of the carrier liquid in the at least one distillation chamber falls below a predetermined level; and
   a pump configured to maintain a positive carrier liquid pressure between the valve and the reflux tank.

2. The distillation system as claimed in claim 1 wherein the distillation system has 4 distillation chambers, each distillation chamber fluidly connected to the condenser at an outlet and a valve to dose the reformed carrier liquid from the reflux tank at an inlet.

3. The distillation system as claimed in claim 1 wherein the carrier liquid is water.

4. The distillation system as claimed in claim 1 wherein the feedstock is pine tree parts selected from the group comprising pine needles or pine wood.

5. The distillation system as claimed in claim 1 wherein the valve is a solenoid valve.

6. The distillation system as claimed in claim 1 wherein the distillation system also comprises a vacuum pump configured to produce a negative air pressure in the distillation system between the at least one chamber and the reflux tank.

7. The distillation system as claimed in claim 6 wherein a vacuum is applied at the reflux tank to draw fluid through the at least one distillation system, condenser and separator to the reflux tank.

8. A method of distillation comprising the following steps:
   vapourising a carrier liquid contained in a distillation chamber to produce a carrier vapour which passes through a feedstock, the feedstock comprising at least one volatile component, to form a feedstock vapour;

condensing the carrier vapour to reform the carrier liquid and condensing the feedstock vapour to form a feedstock;

separating the reformed carrier liquid and feedstock oil; and collecting the reformed carrier liquid and dosing it to the at least one distillation chamber when a water level in the least one distillation chamber falls below a predetermined level.

9. The method as claimed in claim 8 wherein the method steps a) to c) are performed under a vacuum.

10. The method as claimed in claim 8 wherein the carrier liquid in the at least one distillation chamber is heated to a temperature of between 74 to 82° C. and with a vacuum of 18 to 22 inHg.

* * * * *